US007903127B2

(12) United States Patent
Kwon

(10) Patent No.: US 7,903,127 B2

(45) Date of Patent: Mar. 8, 2011

(54) DIGITAL/ANALOG CONVERTER, DISPLAY DEVICE USING THE SAME, AND DISPLAY PANEL AND DRIVING METHOD THEREOF

(75) Inventor: Oh-Kyong Kwon, Suwon-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 938 days.

(21) Appl. No.: 11/229,460

(22) Filed: Sep. 16, 2005

(65) Prior Publication Data

US 2006/0077143 A1 Apr. 13, 2006

(30) Foreign Application Priority Data

Oct. 8, 2004 (KR) ........................ 10-2004-0080368

(51) Int. Cl.
*G09G 3/30* (2006.01)
*G06F 3/038* (2006.01)
*G09G 5/00* (2006.01)
*G09G 5/10* (2006.01)

(52) U.S. Cl. ............................ 345/690; 345/204; 345/76

(58) Field of Classification Search .......... 345/690–693, 345/76–83, 204–206, 589–590; 324/607
See application file for complete search history.

(56) References Cited

U.S. PATENT DOCUMENTS 4,408,190 A 10/1983 Nagano
5,451,946 A * 9/1995 Smith et al. .................. 341/118
5,844,511 A * 12/1998 Izumikawa .................. 341/136
6,344,857 B1 * 2/2002 Matono et al. ................ 345/600
7,034,787 B2 * 4/2006 Date et al. ....................... 345/89
7,221,349 B2 5/2007 Hashido et al.
7,242,378 B2 7/2007 Okabe et al.

(Continued)

FOREIGN PATENT DOCUMENTS

CN 1432985 A 7/2003

(Continued)

OTHER PUBLICATIONS

Korean Patent Abstracts, Publication No. 1020020046756 A; Date of Publication: Jun. 21, 2002; in the name of Seong Jun Bae et al.

(Continued)

*Primary Examiner* — Bipin Shalwala
*Assistant Examiner* — Matthew A Fry
(74) *Attorney, Agent, or Firm* — Christie, Parker & Hale, LLP

(57) ABSTRACT

A display device including a display unit including a plurality of data lines for transmitting data currents, a plurality of scan lines for transmitting scan signals, and a plurality of pixel areas defined by the data lines and the scan lines; a data driver for converting a plurality of grayscale data that include first data and second data into at least one of the data currents, and applying the at least one of the data currents to at least one of the data lines; and a scan driver for sequentially applying the scan signals to the plurality of scan lines, and wherein the data driver divides the plurality of grayscale data into at least two grayscale ranges including a first grayscale range, outputs a first current of the first grayscale range including at least one of the plurality of grayscale data by using the first data, and outputs a second current that corresponds to the second data in the first grayscale range.

17 Claims, 7 Drawing Sheets

U.S. PATENT DOCUMENTS

| | | | | |
|---|---|---|---|---|
| 7,289,087 | B2 | 10/2007 | Date | |
| 7,304,654 | B2 | 12/2007 | Mori et al. | |
| 2003/0058199 | A1* | 3/2003 | Kasai | 345/76 |
| 2004/0222985 | A1* | 11/2004 | Kimura | 345/212 |
| 2004/0263437 | A1 | 12/2004 | Hattori | |
| 2005/0001858 | A1 | 1/2005 | Morita et al. | |
| 2005/0030214 | A1 | 2/2005 | Jo | |
| 2005/0057457 | A1* | 3/2005 | Date | 345/76 |
| 2005/0099328 | A1 | 5/2005 | Kasai | |
| 2005/0156635 | A1* | 7/2005 | Yoneyama et al. | 327/108 |
| 2005/0156834 | A1* | 7/2005 | Jo et al. | 345/76 |
| 2005/0156836 | A1 | 7/2005 | Yoneyama et al. | |
| 2006/0023001 | A1 | 2/2006 | Sung et al. | |
| 2006/0077142 | A1* | 4/2006 | Kwon | 345/77 |
| 2006/0164353 | A1 | 7/2006 | Nakajima et al. | |
| 2006/0187156 | A1 | 8/2006 | Kasai | |
| 2007/0152934 | A1* | 7/2007 | Maeda | 345/92 |

FOREIGN PATENT DOCUMENTS

| | | |
|---|---|---|
| JP | 59-023622 | 2/1984 |
| JP | 61-295721 | 12/1986 |
| JP | 08-084307 | 3/1996 |
| JP | 10-093436 | 4/1998 |
| JP | 2000-122608 | 4/2000 |
| JP | 2000-338935 | 12/2000 |
| JP | 2003-150115 | 5/2003 |
| JP | 2003-255898 | 9/2003 |
| JP | 2004-078163 | 3/2004 |
| JP | 2004-112183 | 4/2004 |
| JP | 2004-361489 | 12/2004 |
| KR | 2002-0046756 | 6/2002 |
| KR | 10-2004-0075716 | 8/2004 |
| KR | 10-2005-0043614 | 5/2005 |
| KR | 10-0551974 | 2/2006 |
| KR | 10-0558779 | 3/2006 |
| KR | 10-2006-0031371 | 4/2006 |

OTHER PUBLICATIONS

Korean Patent Abstracts, Publication No. 1020040075716 A; Date of Publication: Aug. 30, 2004; in the name of Hiroaki Jo.

Korean Patent Abstracts, Publication No. 1020050043614 A; Date of Publication: May 11, 2005; in the name of Toshiyuki Kasai.

Korean Patent Abstracts, Publication No. 1020060031371 A; Date of Publication: Apr. 12, 2006; in the name of Oh Kyong Kwon.

U.S. Office action dated Dec. 2, 2008, for related U.S. Appl. No. 11/229,127, indicating relevance of listed references in this IDS.

Patent Abstracts of Japan, Publication No. 59-023622, dated Feb. 7, 1984, in the name of Toshitaka Tsuda et al.

Patent Abstracts of Japan, Publication No. 08-084307, dated Mar. 26, 1996, in the name of Yoshinao Kobayashi et al.

Patent Abstracts of Japan, Publication No. 10-093436, dated Apr. 10, 1998, in the name of Nobuyuki Shimizu.

Patent Abstracts of Japan, Publication No. 2000-122608, dated Apr. 28, 2000, in the name of Norio Ozawa.

Patent Abstracts of Japan, Publication No. 2003-150115, dated May 23, 2003, in the name of Toshiyuki Kasai.

Patent Abstracts of Japan, Publication No. 2003-255898, dated Sep. 10, 2003, in the name of Shinji Kitahara et al.

Patent Abstracts of Japan, Publication No. 2004-078163, dated Mar. 11, 2004, in the name of Masanori Fujisawa et al.

Patent Abstracts of Japan, Publication No. 2004-112183, dated Apr. 8, 2004, in the name of Genichiro Oga et al.

Patent Abstracts of Japan, Publication No. 2004-361489, dated Dec. 24, 2004, in the name of Norio Ozawa.

U.S. Office action dated Oct. 9, 2009, for related U.S. Appl. No. 11/229,127, noting U.S. Publications listed in this IDS, except 2003/0058199.

Patent Abstracts of Japan, Publication No. 2000-338935, dated Dec. 8, 2000, in the name of Hiroshi Yoshimoto.

U.S. Office action dated Jul. 30, 2010, for related U.S. Appl. No. 11/229,127, noting listed reference in this IDS.

* cited by examiner

DIGITAL/ANALOG CONVERTER, DISPLAY DEVICE USING THE SAME, AND DISPLAY PANEL AND DRIVING METHOD THEREOF

CROSS-REFERENCE TO RELATED APPLICATION

This application claims priority to and the benefit of Korean Patent Application No. 10-2004-0080368, filed in the Korean Intellectual Property Office on Oct. 8, 2004, the entire content of which is incorporated herein by reference.

FIELD OF THE INVENTION

The present invention relates to a display device. More particularly, the present invention relates to an organic light emitting diode (OLED) display using a digital/analog converter, a display panel of the OLED display, and a driving method thereof.

BACKGROUND OF THE INVENTION

In general, an OLED display is a display device that electrically excites fluorescent organic material for emitting light and visualizes an image by voltage programming or current programming N×M organic light emitting pixels.

An organic light emitting pixel (or diode) includes anode (indium tin oxide or ITO), organic thin film, and cathode (metal) layers.

The organic thin film layer has a multi-layer structure including an emitting layer (EML), an electron transport layer (ETL), and a hole transport layer (HTL) so as to balance electrons and holes to thereby enhance light emitting efficiency. Further, the organic thin film separately includes an electron injection layer (EIL) and a hole injection layer (HIL).

Methods of driving the organic light emitting pixels having the foregoing configuration include a passive matrix method and an active matrix method employing a thin film transistor (TFT) or a MOSFET.

In the passive matrix method, an anode and a cathode are formed crossing each other, and a line is selected to drive the organic light emitting pixels. In the active matrix method, an indium tin oxide (ITO) pixel electrode is coupled to the TFT, and the light emitting pixel is driven in accordance with a voltage maintained by capacitance of a capacitor.

Herein, the active matrix method can be classified as a voltage programming method or a current programming method depending on the type of signals transmitted to the capacitor so as to distinctively control the voltage applied to the capacitor.

A pixel circuit according to a conventional voltage programming method has difficulties in expressing high-level grayscales due to deviations of threshold voltages $V_{TH}$ of TFTs and/or mobilities of carriers of the TFTs, the deviations being generated as a result of a non-uniform manufacturing process of the TFTs.

On the other hand, although currents and/or voltages supplied from driving transistors in a plurality of pixel circuits may not be uniform, a pixel circuit employing a current programming method can provide panel uniformity as long as a current supplied from a current source to the pixel circuits is uniform.

In realization of a display device by using the pixel circuit that employs the current programming method, a digital/analog (D/A) converter is required to convert grayscale data into a grayscale current so as to apply the grayscale current to the pixel circuit. In addition, the D/A converter performs a gamma correction on the grayscale data in consideration of characteristics of a display panel of the display device.

However, a conventional D/A converter outputs linear grayscale currents corresponding to grayscale data so that the conventional D/A converter cannot satisfy non-linear gamma characteristics of a display panel.

Accordingly, a desired image is not displayed on the display panel and thus image quality is degraded.

The above information disclosed in this Background of the Invention section is only for enhancement of understanding of the background of the invention and therefore, unless explicitly described to the contrary, it should not be taken as an acknowledgment or any form of suggestion that the above information forms the prior art that is already known in this country to a person skilled in the art.

SUMMARY OF THE INVENTION

An embodiment of the present invention provides a digital/analog converter capable of outputting non-linear grayscale currents and a display device using the same.

An exemplary display device includes a display unit, a data driver, and a scan driver. The plurality of data lines transmit data currents, the plurality of scan lines transmit scan signals, and the plurality of pixel areas are defined by the data lines and the scan lines. The data driver converts a plurality of grayscale data that include first data and second data into at least one of the data currents, and applies the at least one of the data currents to at least one of the data lines. The scan driver sequentially applies the scan signals to the plurality of scan lines. Further, the data driver divides the plurality of grayscale data into at least two grayscale ranges including a first grayscale range, outputs a first current of the first grayscale range in which at least one of the plurality of grayscale data is included by using the first data, and outputs a second current that corresponds to the second data in the first grayscale range.

In another embodiment, a display panel includes a display unit including a plurality of pixels that display an image corresponding to applied data currents, and a grayscale current generator for converting a plurality of grayscale data into the data currents and applying the data currents to the plurality of pixels. In addition, the grayscale current generator divides the plurality of grayscale data into at least two grayscale ranges that include a first grayscale range, generates a first current of the first grayscale range in which at least one of the plurality of grayscale data are included by using a high-order bit data of the at least one of the plurality of grayscale data, generates a second current of the first grayscale range by using a low-order bit data of the at least one of the plurality of grayscale data, and adds the first and second currents and outputs a sum of the first and second currents as at least one of the data currents.

A further embodiment includes a digital/analog (D/A) converter for converting digital grayscale data that include first data and second data into grayscale currents and outputting the converted grayscale currents. The D/A converter divides the grayscale data into a plurality of grayscale ranges including a first grayscale range and converts the divided grayscale data into the grayscale currents. The D/A converter includes a first current output unit, a multiplexer, and a second current output unit. The first current output unit outputs a first reference current of the first grayscale range including the grayscale data by using the first data of the grayscale data. The multiplexer selects a first reference voltage of the first grayscale range from among a plurality of first voltages respectively corresponding to unit currents of the respective grayscale ranges. The second current output unit outputting a second current by using the first reference voltage output from the multiplexer and the second data Another further embodiment includes a digital/analog (D/A) converter converting digital grayscale data that include first data and second data into grayscale currents and outputting a converted result. The digital/analog converter divides the grayscale data into a plurality of grayscale ranges including the first grayscale range and converts the divided grayscale data into the grayscale currents. The digital/analog converter includes a first current output unit, a first multiplexer, and a second current output unit. The first current output unit outputs a first current of the first grayscale range in which the grayscale data is included by using a first data among the grayscale data. The first multiplexer selects a third reference current from among a plurality of third currents that respectively correspond to unit currents of the respective grayscale ranges and outputting the selected third current. The second current output unit copies the third reference current output from the first multiplexer and outputs a current that corresponds to a product of the third reference current and the second data as a second current.

Another further embodiment includes a method for driving a display panel having a plurality of pixel circuits displaying an image corresponding to applied data currents. In the method, a plurality of grayscale data are divided into at least two grayscale ranges that include a first grayscale range. The driving method includes generating a first current of the first grayscale range including at least one of the plurality of the grayscale data by using a first data of the at least one of the plurality of grayscale data; selecting a first reference signal of the first grayscale range from among a plurality of first signals that respectively correspond to the at least two grayscale ranges and outputting the selected first signal; generating a third current corresponding to the first reference signal; generating a second current by using the third current and a second data of the at least one of the plurality of grayscale data; and adding the first current and the second current and outputting an added result as at least one of the data currents.

DETAILED DESCRIPTION

Figure 1:
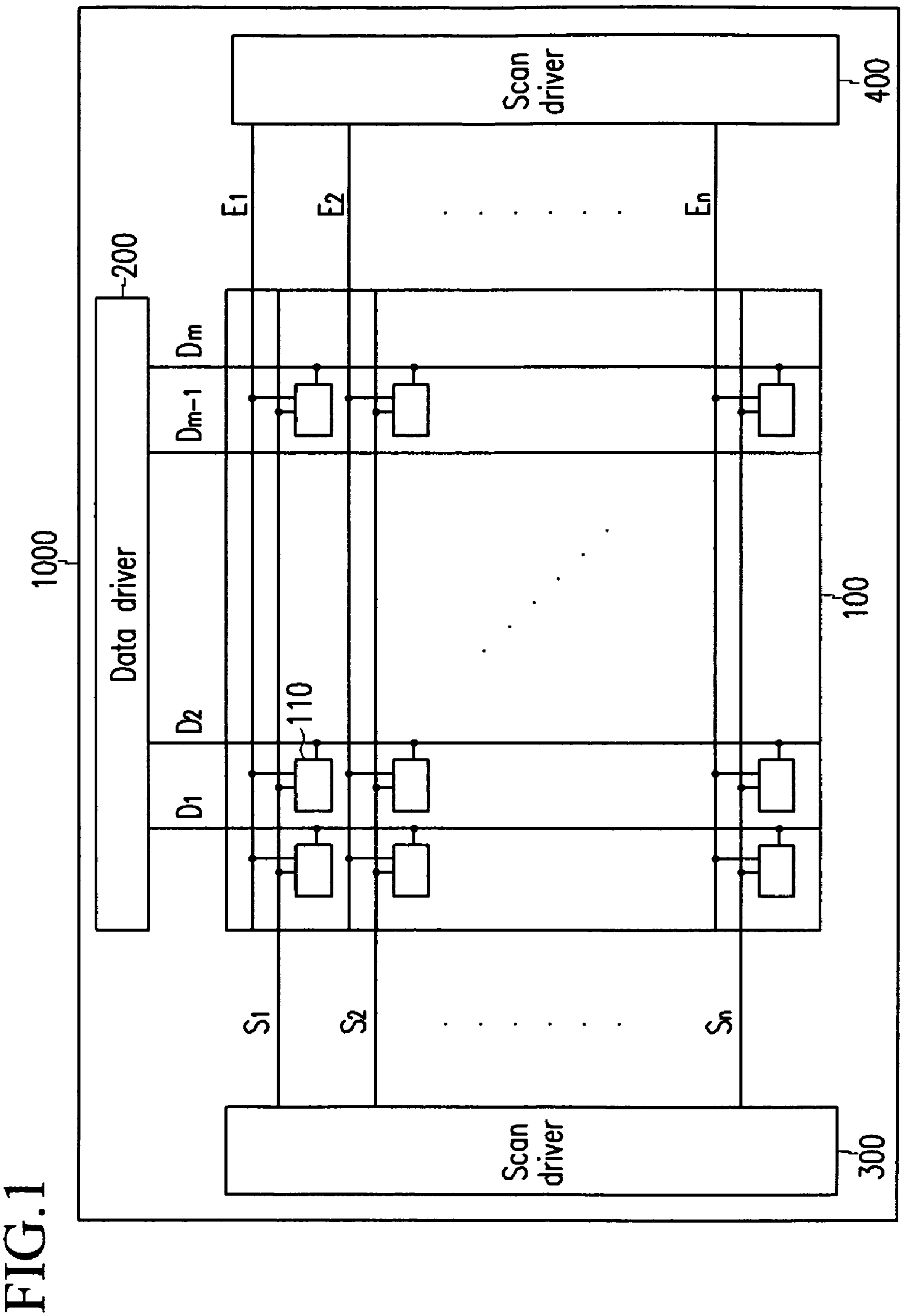
FIG. 1 is a top plan view schematically illustrating an OLED display according to an embodiment of the present invention.

An embodiment of the present invention will hereinafter be described in detail with reference to the accompanying drawings.

In the following detailed description, a connection between one part to another includes a direct connection between them, or an electrical connection via a third device.

The drawings and description are to be regarded as illustrative in nature and not restrictive.

Like reference numerals designate like elements throughout the specification and the drawings.

A display device and a driving method of the same according to an embodiment of the present invention will now be described in more detail with reference to the accompanying drawings.

Throughout the description of certain embodiments of the present invention, a display device that uses electro-luminescence of an organic material will be described as a light emitting display device.

FIG. 1 is a top plan view schematically illustrating an organic light emitting diode (OLED) display according to an embodiment of the present invention.

As shown in FIG. 1, the OLED display according to the embodiment of the present invention includes a substrate 1000 to form a display panel that has a display unit 100 for displaying an image thereon and a peripheral part.

A data driver 200 and scan drivers 300 and 400 are formed in the peripheral part.

The display unit 100 includes a plurality of data lines D1-Dm, a plurality of scan lines S1-Sn, a plurality of light emission control lines E1-En, and a plurality of pixels 110.

The plurality of data lines Dl-Dm are arranged in a column direction, and are for transmitting data currents for an image to the pixels 110.

The plurality of scan lines (or first scan lines) S1-Sn and the plurality of light emission control lines (or second scan lines) E1-En are respectively arranged in a row direction, and are for respectively transmitting scan signals and light emission control signals to the pixels 110.

A pixel area is defined by one data line and one scan line.

The data driver 200 applies a data current (or data currents) to the data lines D1-Dm.

The scan driver 300 sequentially applies scan signal(s) to the plurality of scan lines S1-Sn, and the scan driver 400 sequentially applies light emission control signal(s) to a plurality of light emitting scan lines E1-En.

The data driver 200 and/or scan drivers 300 and 400 may be coupled to the substrate 1000 in various schemes. For example, it may be realized in a form of a chip so as to be installed to various types of electrical connection members, such as a tape carrier package (TCP), a flexible printed circuit, and a film.

On the other hand, the data driver 200 and/or the scan drivers 300 and 400 may be directly attached to the substrate 1000 of the display unit, and/or they may be realized as a driving circuit that is formed on the substrate 1000 and has a layer structure similar to the data lines D1-Dm, scan and light emission control lines S1-Sn and E1-En, and transistors of the pixels (or pixel circuits).

Figure 2:
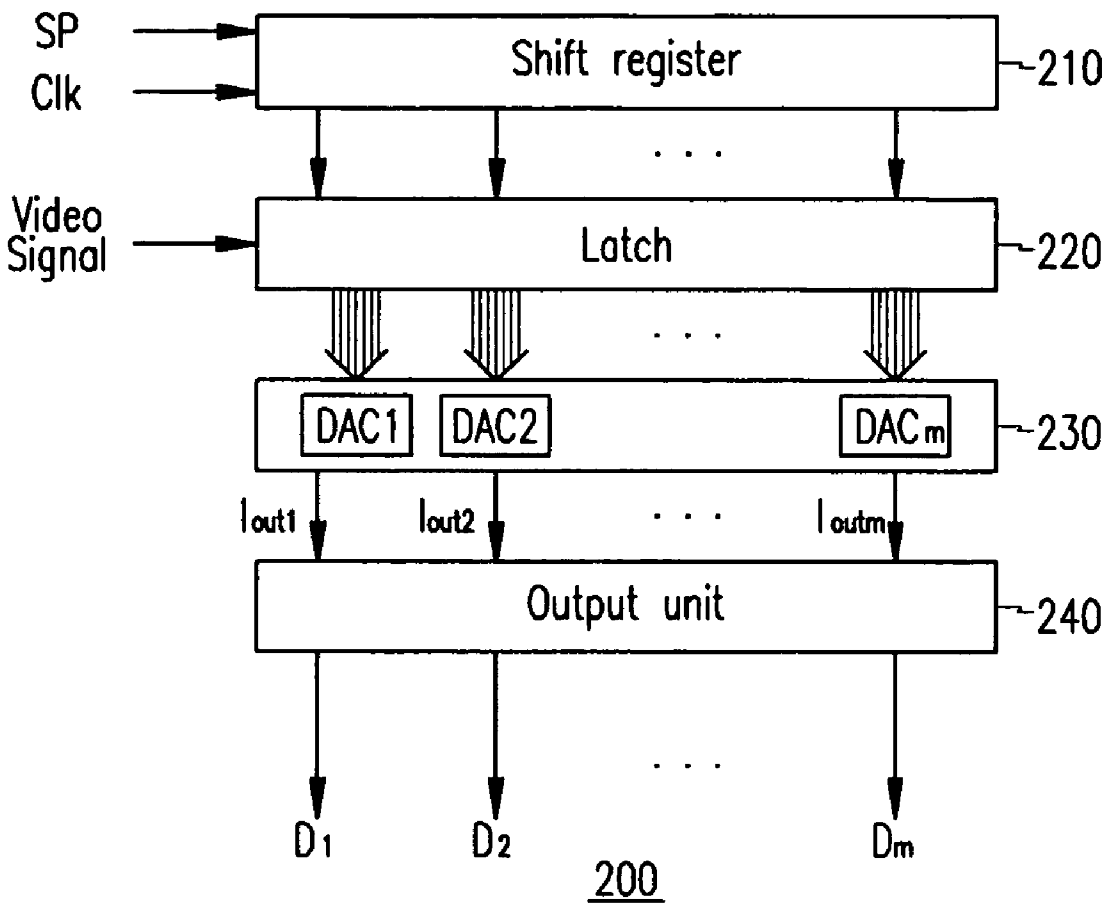
FIG. 2 is a block diagram of a data driver according to an embodiment of the present invention.

FIG. 2 is a block diagram illustrating a data driver 200 according to an embodiment of the present invention.

As shown in FIG. 2, the data driver 200 includes a shift register 210, a latch 220, a grayscale current generator 230, and an output unit 240.

The shift register 210 sequentially shifts a start signal SP and outputs the sequentially shifted start signal in synchronization with a clock signal Clk.

The latch 220 latches a video signal and outputs the latched video signal in synchronization with an output signal of the shift register 210.

The grayscale current generator 230 receives the output video signal of the latch 220 and generates a grayscale current that corresponds to the video signal.

According to an embodiment of the present invention, the grayscale current generator 230 includes a plurality of digital/analog (D/A) converters DAC1-DACm. Each of the plurality of D/A converters DAC1-DACm converts an input digital video signal into a respective one of the grayscale currents Iout1-Ioutm and outputs the respective one of the grayscale currents Iout1-Ioutm.

The output unit 240 applies the grayscale currents Iout1-Ioutm output from the grayscale current generator 230 to the data lines D1-Dm.

The output unit 240 may be provided as a plurality of buffer circuits respectively coupled between the D/A converters DAC1-DACm included in the grayscale current generator 230 and the data lines D1-Dm.

A grayscale current generator (e.g., the grayscale current generator 230) according to a first embodiment of the present invention will now be described with reference to FIGS. 3, 4, and 5.

In the following descriptions, a video signal is described to be a 6-bit grayscale data, for better understanding and ease of description, but the present invention is not thereby limited.

Figure 3:
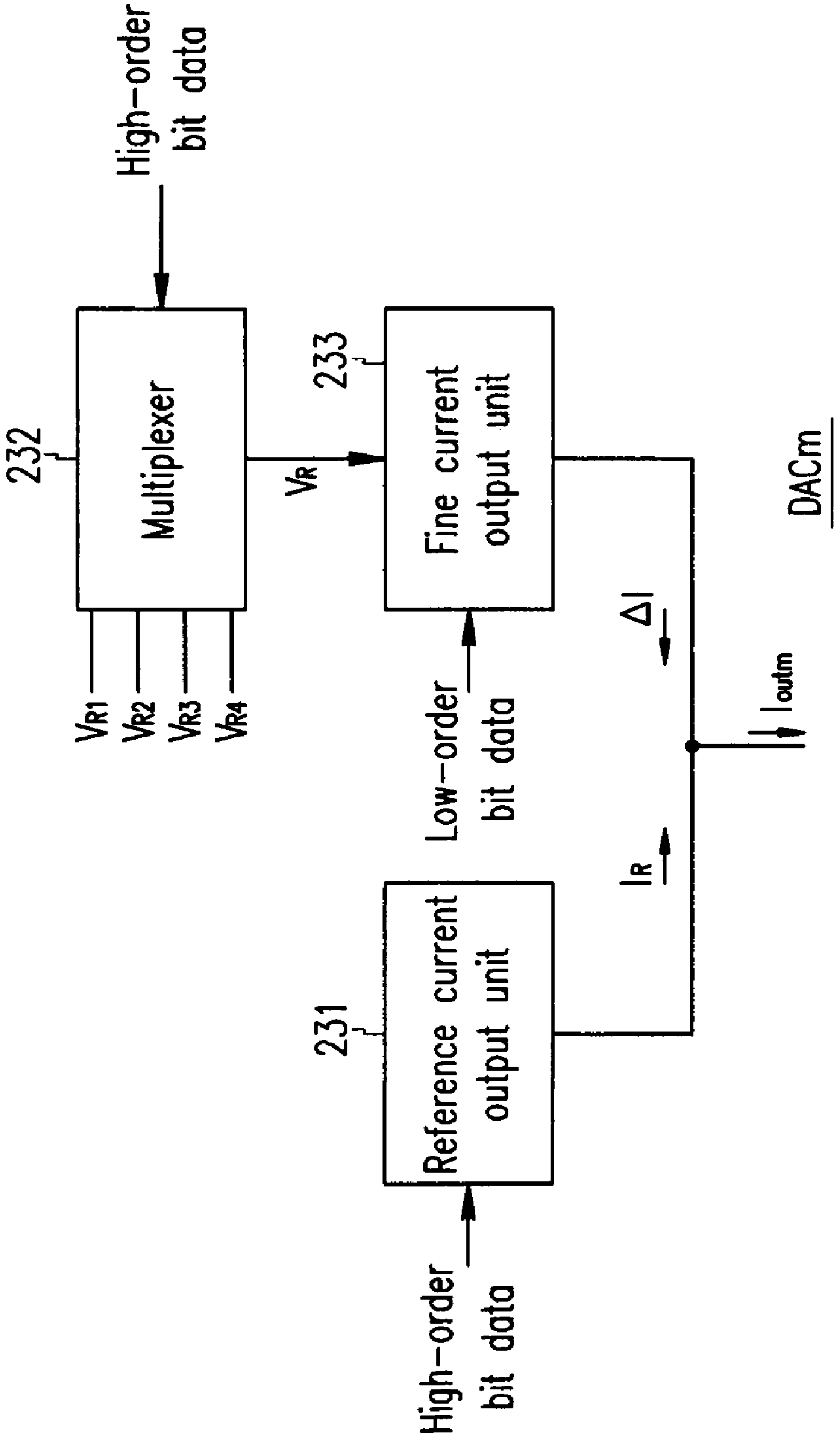
FIG. 3 is a block diagram of a grayscale current generator of the D/A converter according to a first embodiment of the present invention.

FIG. 3 is a block diagram illustrating a D/A converter DACm of the grayscale current generator 230 according to the first embodiment of the present invention.

Figure 4:
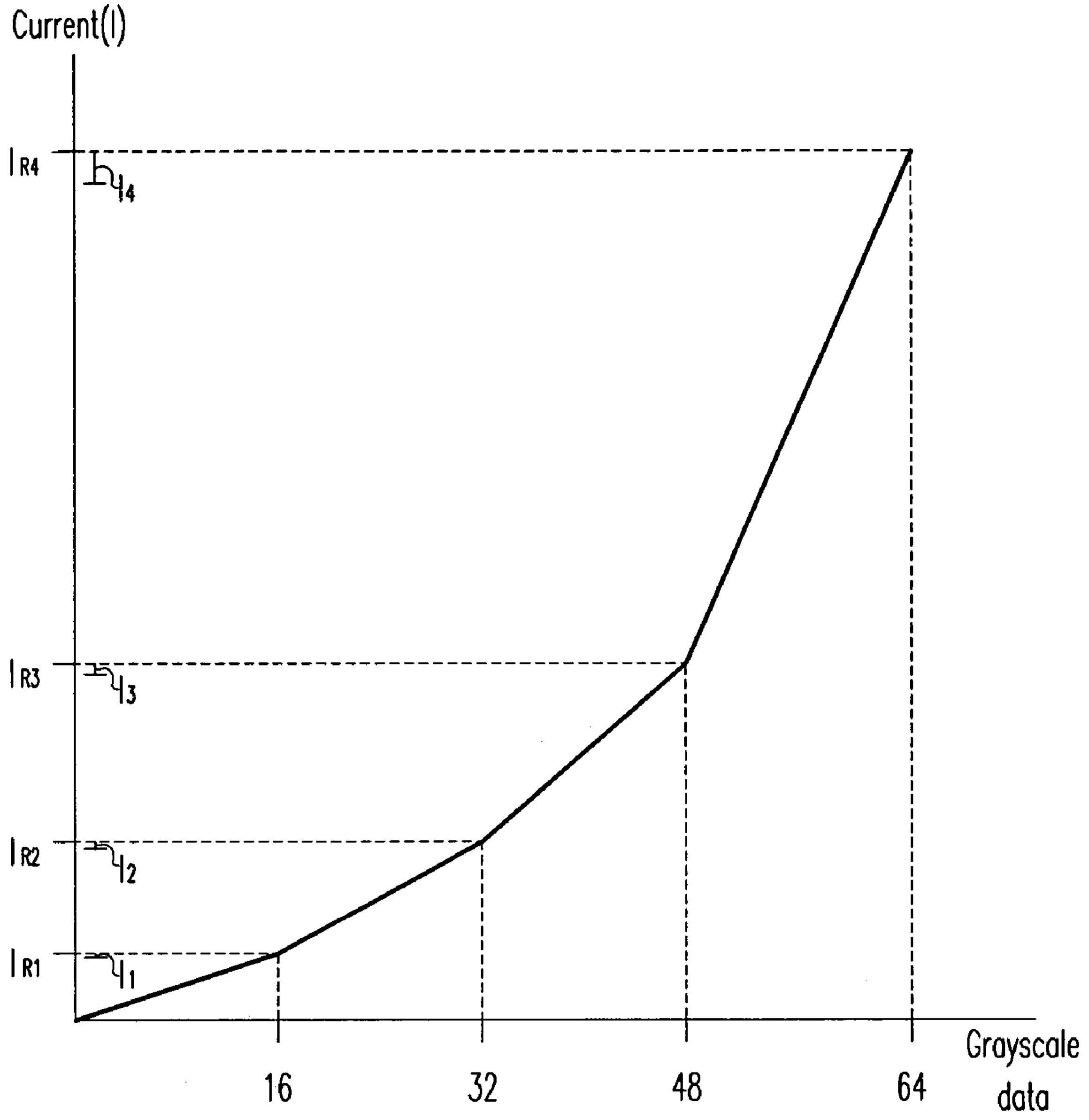
FIG. 4 shows a gamma curve according to the first embodiment of the present invention.
Figure 5:
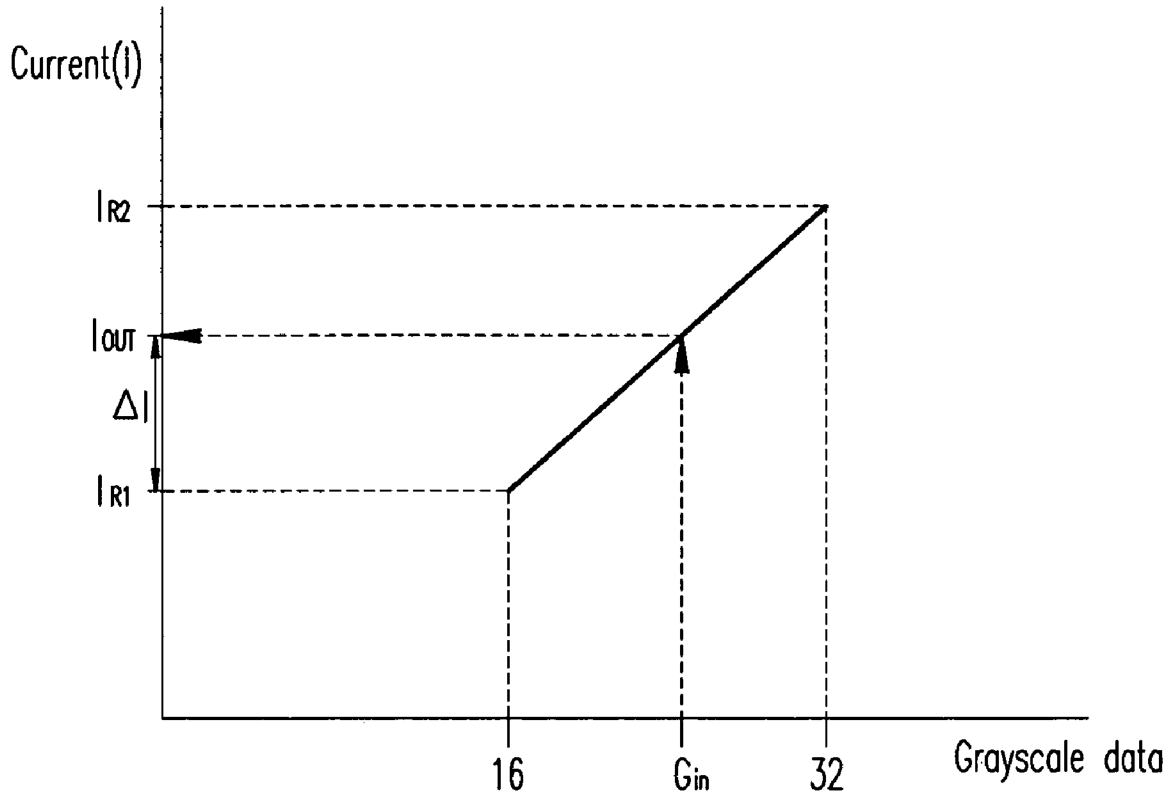
FIG. 5 shows a range that corresponds to a second grayscale range in the gamma curve of FIG. 4.

FIG. 4 illustrates a gamma curve according to the first embodiment of the present invention, and FIG. 5 exemplarily illustrates an output grayscale current corresponding to an input grayscale data of a second grayscale range.

As shown in FIG. 3, the D/A converter DACm includes a reference current output unit 231, a multiplexer 232, and a fine current output unit 233 according to the first embodiment of the present invention.

The reference current output unit 231 receives a high-order bit data of the grayscale data and outputs a reference current $I_R$.

The multiplexer 232 selects a reference voltage $V_R$ that corresponds to the high-order bit data and transmits the selected reference voltage $V_R$ to the fine current output unit 233, and the fine current output unit 233 receives the reference voltage $V_R$ and outputs a fine current ΔI that corresponds to a low-order bit data of the grayscale data.

Referring to FIG. 4 and according to one embodiment of the present invention, the grayscale current generator 230 controls the gamma curve to be divided into a plurality of grayscale ranges, controls the reference current output unit 231 to output reference currents $I_{R1}$-$I_{R3}$ or an offset current by using the high-order bit data of the grayscale data, and controls the fine current output unit 233 to output grayscale data that corresponds to the low-order bit data of the grayscale data.

The fine current may be obtained by multiplying respective unit currents $I_1$-$I_4$ of the respective grayscale ranges and the low-order bit data. Values of the unit currents $I_1$-$I_4$ vary according to the gradient of the gamma curve in first through fourth grayscale ranges, respectively.

Thus, when the multiplexer 232 selects a reference voltage of a grayscale range in which the corresponding grayscale data is included and transmits the selected reference voltage to the fine current output unit 233, the fine current output unit 233 outputs a fine current ΔI by using a unit current I and a lower-order bit data of grayscale data of the grayscale range.

In other words, as shown in FIG. 5, when a grayscale data Gin of the second grayscale range is input, the reference current output unit 231 outputs a reference current $I_{R1}$ by using a high-order bit data of the grayscale data Gin.

The multiplexer 232 transmits a reference voltage $V_{R2}$ of the second grayscale range to the fine current output unit 233, and the fine current output unit 233 outputs a fine current ΔI by using a low-order bit data of the grayscale data Gin.

For example, when the grayscale data Gin is 25 (011001), the reference current output unit 231 outputs a reference current $I_{R1}$ corresponding to the high-order bit data 16 (01), and the multiplexer 232 outputs the reference voltage $V_{R2}$, and the fine current output unit 233 outputs a current that corresponds to 9 times the unit current $I_2$.

Accordingly, the grayscale current generator 230 outputs a grayscale current corresponding to a grayscale data with respect to the divided grayscale ranges.

An internal configuration of a D/A converter (e.g., the D/A converter DACm) according to the first embodiment will now be described in more detail with reference to FIG. 6.

Figure 6:
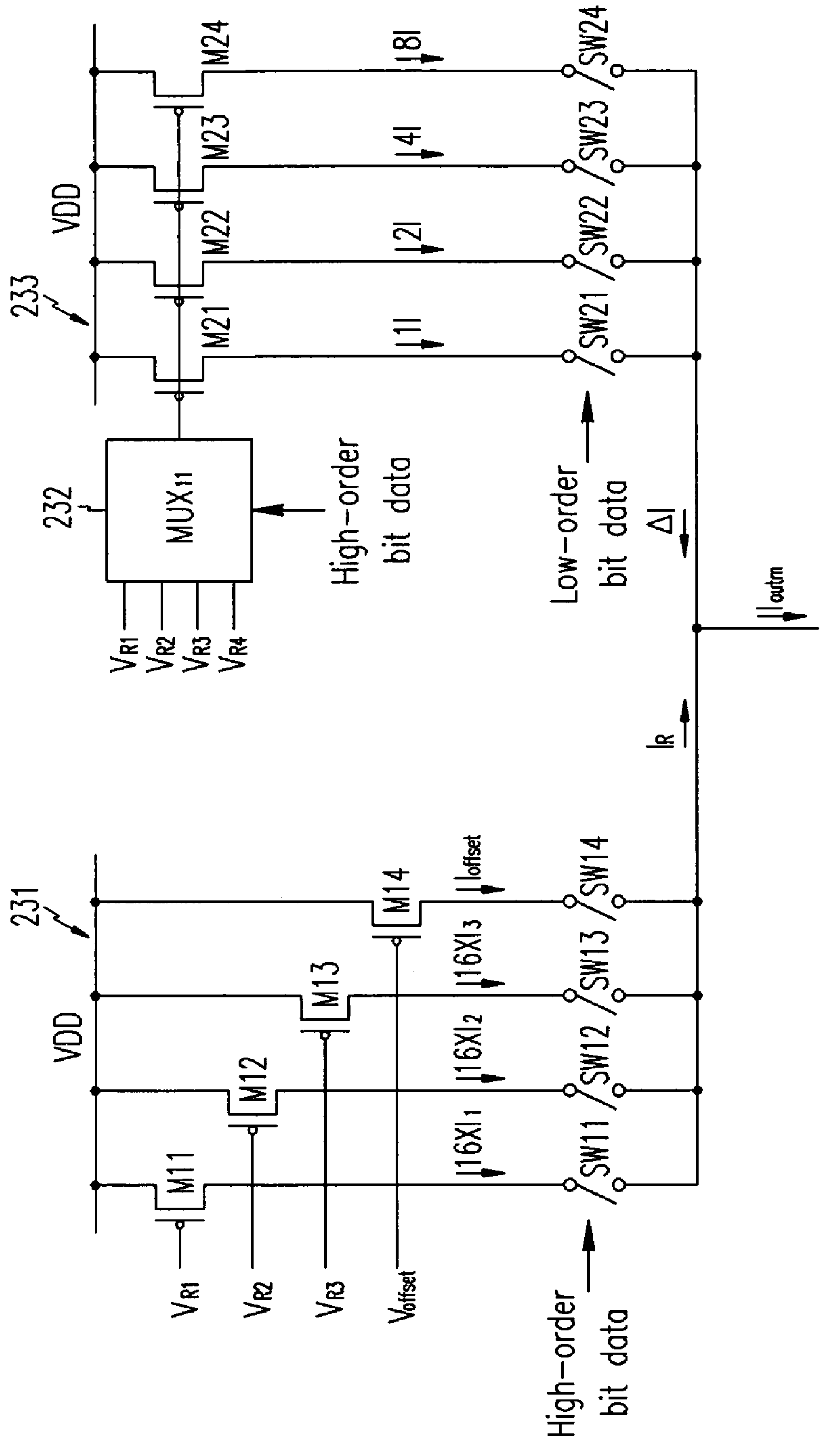
FIG. 6 is a circuit diagram illustrating the D/A converter according to the first embodiment of the present invention.

FIG. 6 is a circuit diagram illustrating the D/A converter (e.g., the D/A converter DACm) according to the first embodiment of the present invention.

As shown in FIG. 6, the reference current output unit 231 includes four transistors M11-M14 and four switches SW1-SW14, receives a high-order bit data of grayscale data, and outputs a corresponding reference current $I_R$.

Gates of the respective transistors M11-M14 are applied with reference voltages $V_{R1}$-$V_{R3}$ and offset voltages Voffset, and sources of the respective transistors M11-M14 are coupled to a power source VDD.

The switches SW11-SW14 are respectively coupled to drains of the respective transistors M11-M14, and turned on/off by the high-order bit data of the grayscale data.

In addition, the transistors M11-M13 may be set to respectively output currents that correspond to 16 times the unit currents $I_1$, $I_2$, and $I_3$ by using reference voltages $V_{R1}$, $V_{R2}$, and $V_{R3}$ applied to the gates of the transistors M11-M13, respectively. The transistor M14 may be set to output an offset current Ioffset by using an offset voltage Voffset applied to the gate of the transistor M14.

In this instance, the offset current Ioffset corresponds to grayscale data 0.

Thus, the switch SW14 is turned on and outputs the offset current Ioffset when the high-order bit data of the grayscale data is '00', and the switch SW11 is turned on and outputs the reference current $I_{R1}$ when the high-order bit data is '01'.

When the high-order bit data is '10', the switches SW11 and SW12 are turned on and output the reference current $I_{R2}$ as shown in the Equation 1, and when the high-order bit data is '11', the switches SW11, SW12, and SW13 are turned on and output the reference current $I_{R3}$ as shown in the Equation 2.

$$I_{R2}=16\times I_1+16\times I_2 \quad \text{[Equation 1]}$$

$$I_{R3}=16\times I_1+16\times I_2+16\times I_3 \quad \text{[Equation 2]}$$

Since a current does not have to be output when the high-order bit data of the grayscale data is '00', the offset current Ioffset may be output when the high-order bit data is '01'. A case in which the offset current Ioffset is output when the high-order bit data of the grayscale data is '00' will now be described in more detail.

The multiplexer 232 receives the high-order bit data of the grayscale data, selects one of four reference voltages $V_{R1}$-$V_{R4}$, and transmits the selected reference voltage to the fine current output unit 233.

That is, the reference voltage $V_{R1}$ is output when the high-order bit data of the grayscale data (00) is included in the first grayscale range, and the reference voltages $V_{R2}$-$V_{R4}$ are output when the high-order bit data of the grayscale data are '01', '10', and '11' respectively.

The fine current output unit 233 includes four transistors M21-M24 and four switches SW21-SW24.

Each transistor M21-M24 outputs a current that corresponds to a reference voltage output from the multiplexer 232, and each switch SW21-SW24 is turned on in response to a low-order bit data of the grayscale data.

According to an embodiment of the present invention, a width and a length of a channel of the transistor M21 is set such that the transistor M21 outputs a unit current I of a grayscale range that corresponds to the reference voltage $V_R$, and widths and lengths of channels of the transistors M22-M24 are set such that transistors M22-M24 output 2 times, 4 times, and 8 times the unit current I, respectively.

In more detail, a width-to-length ratio between the channel of the transistor M21 and the channel of each of the transistors M11-M14 included in the reference current output unit 231 is set to be one to sixteen (1:16), and the width and the length of the channels of the transistors M22-M24 are respectively set to be 2 times, 4 times, and 8 times the width and length of the channel of the transistor M21.

Thus, when the grayscale data of the first grayscale range is input, the multiplexer 232 selects the reference voltage $V_{R1}$ and transmits the selected reference voltage $V_{R1}$ to the fine current output unit 233, and a current corresponding to 0 to 15 times the unit current $I_1$ is output as the fine current ΔI by the switches SW21-SW24 being turned on/off by a low-order bit data of the grayscale data.

In a like manner, when grayscale data of the second to the fourth grayscale ranges are input, the multiplexer 232 selects one of the reference voltages $V_{R2}$-$V_{R4}$ and transmits the selected reference voltage to the fine current output unit 233, and currents corresponding to 0 to 15 times the respective unit currents $I_2$-$I_4$ are output as the fine currents ΔI by the switches SW21-SW24 being turned on/off by low-order bit data of the grayscale data.

As described above, a grayscale current that reflects non-linear gamma characteristics may be output by dividing grayscales using a high-order bit data of grayscale data and outputting a fine current in an associated grayscale range using a low-order bit data of the grayscale data.

In FIG. 6, the transistors M11-M14, M21-M24 are provided as a MOS transistor of a P-type channel, and a power source VDD is applied to a source of the MOS transistor, but it should be understood that the present invention is not limited thereto. Thus, the transistors M11-M14, M21-M24 may be provided as an N-type channel MOS transistor according to another embodiment of the present invention.

A D/A converter (e.g., the D/A converter DACm) according to a second embodiment of the present invention will now be described with reference to FIG. 7.

Figure 7:
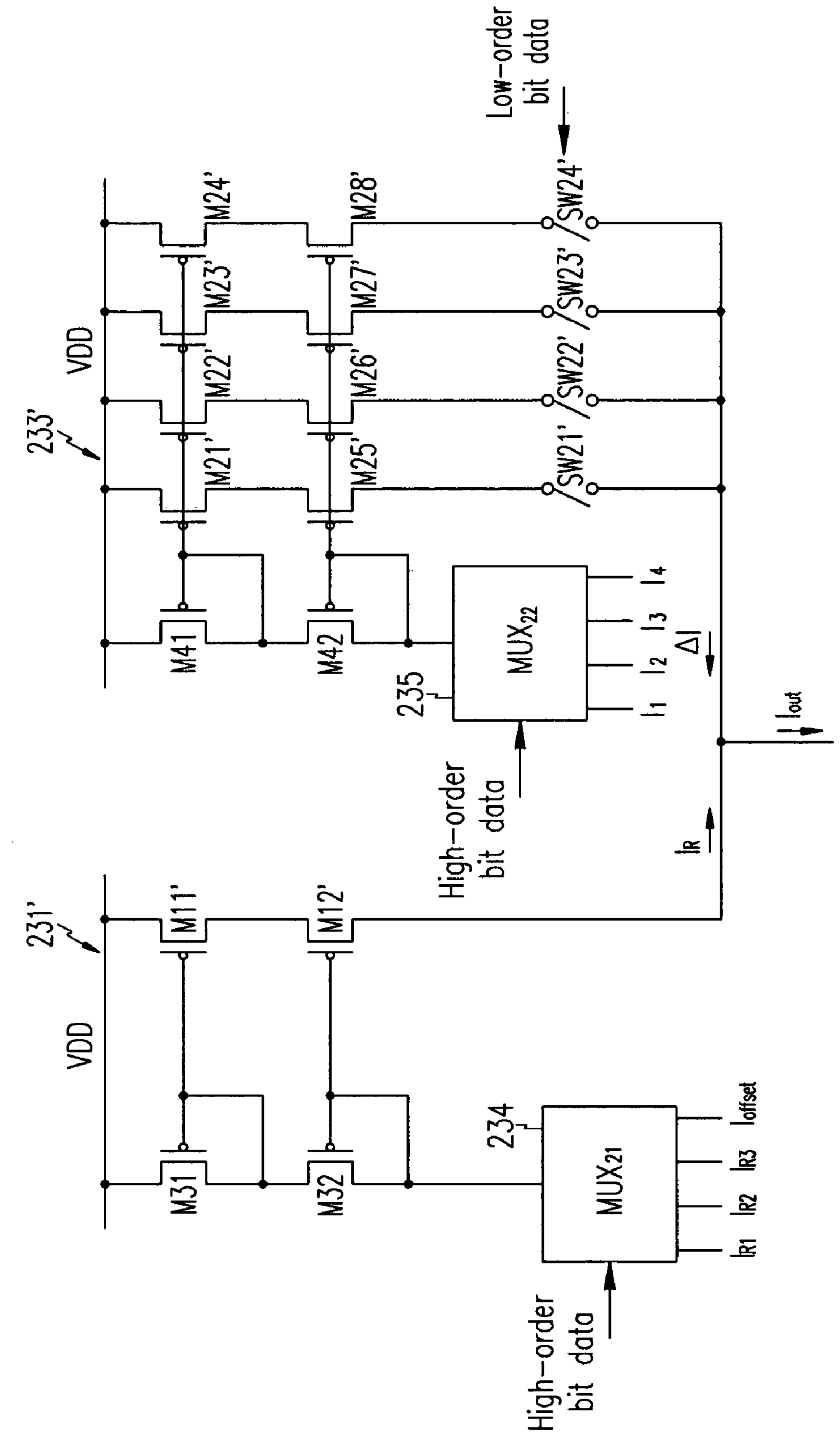
FIG. 7 is a circuit diagram illustrating a D/A converter according to a second embodiment of the present invention.

FIG. 7 illustrates the D/A converter (e.g., the D/A converter DACm) according to the second embodiment of the present invention.

The D/A converter (e.g., the D/A converter DACm) in the second embodiment is a current mirror D/A converter that uses a reference current in contrast with the D/A converter in the first embodiment of the present invention.

In more detail, the current mirror D/A converter of FIG. 7 includes a reference current output unit 231', a fine current output unit 233', a first multiplexer 234, and a second multiplexer 235 according to the second embodiment of the present invention.

The reference current output unit 231' includes a current mirror circuit formed by transistors M11', M12', M31, and M32, and the first multiplexer 234.

The first multiplexer 234 selects a current that corresponds to a high-order bit data of the grayscale data from four currents ($I_{R1}$-$I_{R3}$ and Ioffset), and applies the selected current to the transistors M31 and M32.

Since gates of the transistors M31, M32 and gates of the transistors M11', M12' are coupled to each other and form the current mirror circuit, a current flowing to/from the first transistors M11' and M12' is substantially equivalent to the selected current.

Thus, the reference current output unit 231' outputs the offset current $I_{offset}$ when the high-order bit data is '00', and outputs the reference currents $I_{R1}$-$I_{R3}$ when the high-order bit data are '01', '10', and '11', respectively.

The second multiplexer 235 selects a unit current that corresponds to the high-order bit data of the grayscale data from unit currents $I_1$-$I_4$ and applies the selected unit current to the fine current output unit 233'.

In other words, the unit current $I_1$ is output when the high-order bit data of the grayscale data is '00', and the unit currents $I_2$-$I_4$ are output when the high-order bit data are '01', '10', and '11', respectively.

The fine current output unit 233' includes transistors M41 and M42 coupled between a power source VDD and the second multiplexer 235, transistors M21'-M28' copying currents flowing to/from the transistors M41 and M42, and switches SW21'-SW24' being turned on/off by a low-order bit data of the grayscale data.

The transistors M21' and M25' are coupled in series between the power source VDD and the switch SW21', and gates of the transistors M21' and M25' are respectively coupled to gates of the transistors M41 and M42 such that the currents flowing to/from the transistors M41 and M42 are copied.

According to an embodiment of the present invention, a width-to-length ratio of channels of the transistors M21' and M25' is set to be substantially equivalent to that of the transistors M41 and M42.

In a like manner, the transistors M22' and M26', the transistors M23' and M27', and the transistors M24' and M28' are respectively coupled in series between the power source VDD and the switches SW22'-SW24', and lengths and widths of channels of the transistors M22' and M26', the transistors M23' and M27', and the transistors M24' and M28' are respectively set to output 2 times, 4 times, and 8 times the current flowing to/from the transistors M41 and M42.

With this configuration, a fine current ΔI within a grayscale range may be output by turning on/off the switches SW21'-SW24' by using the low-order bit data of the grayscale data.

The current mirror D/A converter of FIG. 7 may also include a sample/hold circuit (not shown) that samples and holds a grayscale current output from the D/A converter.

In this case, output currents of a plurality of D/A converters DAC1-DACm are sampled and held on each data line D1-Dm at a substantially equivalent period.

According to an embodiment of the present invention, a grayscale data is divided into a plurality of grayscale ranges by using a high-order bit data of the grayscale data, and a fine current of each grayscale range is generated by using a low-order bit data of the grayscale data such that a grayscale current that satisfies a nonlinear characteristic of the gamma curve may be applied to pixel circuits.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A display device comprising:

a display unit including a plurality of data lines for transmitting data currents, a plurality of scan lines for transmitting scan signals, and a plurality of pixel areas defined by the data lines and the scan lines;

a data driver for converting a plurality of grayscale data including high-order data and low-order data into at least one of the data currents, and applying the at least one of the data currents to at least one of the data lines; and a scan driver for sequentially applying the scan signals to the plurality of scan lines, wherein the data driver is configured to:

divide the plurality of grayscale data into at least two nonoverlapping grayscale ranges including a first grayscale range, output a first current of the first grayscale range including at least one of the plurality of grayscale data by using the high-order data, and output a second current corresponding to the low-order data in the first grayscale range, wherein the data driver comprises:

a shift register for receiving a first signal and a clock signal, and shifting the first signal in synchronization with the clock signal;

a latch for latching the at least one of the plurality of grayscale data and outputting the latched grayscale data in synchronization with an output signal of the shift register; and a grayscale current generator for converting the latched grayscale data output from the latch into the at least one of the data currents, and outputting the at least one of the data currents, wherein the grayscale current generator comprises:

a first current output unit for outputting the first current of the first grayscale range by using the high-order data;

a multiplexer for selecting a first reference voltage of the first grayscale range from among a plurality of unit current reference voltages respectively corresponding to unit currents of the grayscale ranges, each of the unit currents and the unit current reference voltages, of a respective grayscale range of the grayscale ranges, representing a difference between two grayscale currents respectively corresponding to two grayscale data neighboring each other in the respective grayscale range; and a second current output unit for outputting the second current by using the first reference voltage output from the multiplexer and the low-order data, wherein the second current output unit comprises:

a plurality of second transistors for outputting fourth currents corresponding to the first reference voltage output from the multiplexer, and a plurality of second switches for outputting the fourth currents of the second transistors as the second current in response to the low-order data, and wherein the at least one of the data currents comprises a sum of the first and second currents.

2. The display device of claim 1, wherein the high-order data is a high-order bit data of the at least one of the plurality of grayscale data, and the low-order data is a low-order bit data of the at least one of the plurality of grayscale data.

3. The display device of claim 1, wherein the first current is an initial current of the first grayscale range, the second current is substantially equivalent to a product of the low-order data and a unit current, of the unit currents, of the first grayscale range.

4. The display device of claim 1, wherein the first current output unit comprises:

a plurality of first transistors for respectively outputting third currents corresponding to a plurality of second voltages, and a plurality of first switches for respectively outputting the third currents of the first transistors as the first current in response to the high-order data.

5. The display device of claim 4, wherein the plurality of second voltages is substantially equivalent to the plurality of unit current reference voltages, the third currents substantially correspond to respective initial current differences of respective neighboring grayscale ranges of the grayscale ranges, and the first current is substantially a sum of the third currents of grayscale ranges lower than or equal to the first grayscale range.

6. The display device of claim 1, wherein each of the fourth currents corresponds to a different multiple of a unit current, of the unit currents, of the first grayscale range, and the second current is substantially a sum of the fourth currents output from the plurality of second switches.

7. A display panel comprising:

a display unit including a plurality of pixels for displaying an image corresponding to applied data currents; and a grayscale current generator for converting a plurality of grayscale data into the data currents and applying the data currents to the plurality of pixels, wherein the grayscale current generator is configured to:

divide the plurality of grayscale data into at least two nonoverlapping grayscale ranges including a first grayscale range, generate a first current of the first grayscale range including at least one of the plurality of grayscale data by using a high-order bit data of the at least one of the plurality of grayscale data, generate a second current of the first grayscale range by using a low-order bit data of the at least one of the plurality of grayscale data, add the first and second currents, and output a sum of the first and second currents as at least one of the data currents, wherein the grayscale current generator comprises:

a first current output unit for outputting the first current of the first grayscale range by using the high-order bit data, a multiplexer for selecting a first reference voltage of the first grayscale range from among a plurality of unit current reference voltages respectively corresponding to unit currents of the grayscale ranges, each of the unit currents and the unit current reference voltages, of a respective grayscale range of the grayscale ranges, representing a difference between two grayscale currents respectively corresponding to two grayscale data neighboring each other in the respective grayscale range; and a second current output unit for outputting the second current by using the first reference voltage output from the multiplexer and the low-order bit data, and wherein the second current output unit comprises:

a plurality of second transistors for outputting fourth currents corresponding to the first reference voltage output from the multiplexer, and a plurality of second switches for outputting the fourth currents of the second transistors as the second current in response to the low-order bit data.

8. The display panel of claim 7, wherein the first current is an initial current of the first grayscale range, and the second current is substantially equivalent to a product of an integer corresponding to the low-order bit data and a unit current, of the unit currents, of the first grayscale range.

9. The display panel of claim 7 further comprising a scan driver for applying scan signals to the plurality of pixels.

10. A digital/analog (D/A) converter for converting digital grayscale data including high-order data and low-order data into grayscale currents and outputting the converted grayscale currents, the D/A converter being for dividing the grayscale data into a plurality of nonoverlapping grayscale ranges including a first grayscale range and converting the divided grayscale data into the grayscale currents, the D/A converter comprising:

a first current output unit for outputting a first current of the first grayscale range of the grayscale data by using the high-order data of the grayscale data;

a multiplexer for selecting a first reference voltage of the first grayscale range from among a plurality of unit current reference voltages respectively corresponding to unit currents of the respective grayscale ranges, each of the unit currents and the unit current reference voltages, of a respective grayscale range of the grayscale ranges, representing a difference between two grayscale currents respectively corresponding to two grayscale data neighboring each other in the respective grayscale range; and a second current output unit for outputting a second current by using the first reference voltage output from the multiplexer and the low-order data of the grayscale data, wherein the first current output unit comprises:

a plurality of first transistors for outputting third currents respectively corresponding to the plurality of first voltages, and a plurality of first switches for outputting the third currents of the first transistors as the first current in response to the high-order data, wherein the second current output unit comprises:

a plurality of second transistors for outputting fourth currents corresponding to the first reference voltage output from the multiplexer, and a plurality of second switches for outputting the fourth currents of the second transistors as the second current in response to the low-order data, and wherein one of the grayscale currents comprises a sum of the first and second currents.

11. The D/A converter of claim 10, wherein the second current is substantially equivalent to a product of an integer corresponding to the low-order data and a unit current, of the unit currents, of the first grayscale range.

12. A digital/analog (D/A) converter for converting digital grayscale data including high-order data and low-order data into grayscale currents and outputting a converted result, the D/A converter being for dividing the grayscale data into a plurality of nonoverlapping grayscale ranges and converting the divided grayscale data into the grayscale currents, the D/A converter comprising:

a first current output unit for outputting a reference current from among a plurality of reference currents of the respective grayscale ranges by using the high-order data of the grayscale data;

a first multiplexer for directly selecting a unit current from among a plurality of unit currents of the respective grayscale ranges and outputting the selected unit current, each of the plurality of unit currents, corresponding to a respective grayscale range of the grayscale ranges, representing a difference between two grayscale currents respectively corresponding to two grayscale data neighboring each other in the respective grayscale range; and a second current output unit for copying the unit current output from the first multiplexer and outputting a current corresponding to a product of the unit current and the low-order data of the grayscale data as a second current, wherein the converted result comprises a sum of the reference current and the second current.

13. The D/A converter of claim 12, wherein the first current output unit comprises a second multiplexer for selecting the reference current from among the plurality of reference currents and outputting the selected reference current, and a current mirror circuit for mirroring the reference current output from the second multiplexer and outputting the mirrored reference current.

14. The D/A converter of claim 12, wherein the second current output unit comprises:

a plurality of current mirror circuits for mirroring the unit current output from the first multiplexer, and outputting a current corresponding to a multiple of the mirrored unit current.

15. The display device of claim 6, wherein each of the different multiples of the unit current of the first grayscale range corresponds to a different power-of-two multiple of the unit current of the first grayscale range.

16. The D/A converter of claim 10, wherein the third currents substantially correspond to respective initial current differences of respective neighboring grayscale ranges of the grayscale ranges, and the first current is substantially identical to a sum of the third currents of grayscale ranges lower than or equal to the first grayscale range.

17. The D/A converter of claim 10, wherein each of the fourth currents corresponds to a different multiple of a unit current, of the unit currents, of the first grayscale range, and the second current is substantially identical to a sum of the fourth currents output from the plurality of second switches.

* * * * *